March 1, 1966 J. JAMES 3,237,987
SEAT BACK ADJUSTMENT
Filed Jan. 2, 1964 2 Sheets-Sheet 1

INVENTOR.
JIMMIE JAMES
BY
Strauch, Nolan & Neale

March 1, 1966 J. JAMES 3,237,987
SEAT BACK ADJUSTMENT
Filed Jan. 2, 1964 2 Sheets-Sheet 2

INVENTOR.
JIMMIE JAMES
BY
Strauch, Nolan & Neale

United States Patent Office 3,237,987
Patented Mar. 1, 1966

3,237,987
SEAT BACK ADJUSTMENT
Jimmie James, Madison Heights, Mich., assignor, by mesne assignments, to Rockwell-Standard Corporation, a corporation of Delaware
Filed Jan. 2, 1964, Ser. No. 335,301
7 Claims. (Cl. 297—374)

The present invention refers to position adjustment and lock mechanisms and more particularly to such mechanisms which are infinitely variably adjustable in both directions of rotaton and automatically lock in the adjusted position. In its preferred embodiment the invention has special utility for a seat back adjusting mechanism.

Rotatable adjustment or drive mechanisms are known employing an outer member, an inner member concentric therewith, cam faces on one of the members and balls or rollers or the like wedging means between the inner and outer members usually spring biased in wedging position so that free relative rotation of the members is possible only in one direction whereas free rotation in the other direction is prevented by the wedging means. An example of this type of one way ratchet drive mechanism is disclosed in United States Patent 1,985,406 to N. B. Galkin.

However, in order to effectively apply ths type of mechanism to the tilt adjustment of a seat back, and similar applications, means must be employed to release the wedging means which are used to lock the seat back against rearward movement in an adjusted tilted position so that the seat back may be further adjusted rearwardly to another position. Upon inactivating of the lock release the seat back again locks in the adjusted position. A mechanism of this type is disclosed in co-pending application, Serial No. 194,340, filed May 14, 1962.

Although normally there is only a slight pressure on the seat back in forward direction the seat back tilts freely forwardly when the vehicle stops abruptly exerting pressure on the back of the occupant and thus amplifying his own moment force forwardly. The back of an unoccupied seat is thrown all the way forwardly upon the seat cushion under sudden deceleration of the vehicle. This may result in damage to the seat mechanism, car upholstery or objects lying on the seat. Further the weight of the passenger is not sufficient to resist the forceful forward tilting movement of the seat back when the vehicle is abruptly braked, thus throwing the passenger from the seat to the floor or against the dashboard of the vehicle resulting in possible serious injuries.

For the above reasons and to increase the stability of the seat back tilting mechanism it is desirable to lock the seat back against both forward and rearward tilting in any position to which it has been moved.

The present invention comprises novel means to accomplish this purpose.

Accordingly, an important object of the present invention is to provide a novel infinite adjustable lock mechanism for a seat back capable of automatically locking the seat back in any desired position between the limits of the adjustment angle in both directions of tilting.

Another object is to provide release means in a novel infinite adjustable bi-directional lock mechanism for a seat back to selectively release the lock for either forward or rearward adjustment of the seat back without affecting the other lock means.

A further object resides in the provision of novel cam and roller type lock or clutch mechanisms for a seat back adjustment comprising two independent groups of rollers each spring biased into lock position and separate means operable independently of each other to release either group of rollers from its locking position without disturbing the lock position of the other group of rollers.

Still another object is the provision of novel release means for a cam and roller type lock or clutch mechanism which comprises adjacent plates rotatable relative to each other and having roller retaining and spring retaining means between them by which the plates are rotated in opposite direction to wedge the rollers against the cam surfaces, and a hand lever adapted to rotate individually either one of the plates to release the rollers associated with that plate from their wedging engagement.

Other objects or novel features will become apparent as the description proceeds with reference to the accompanying drawings in which.

Figure 1:
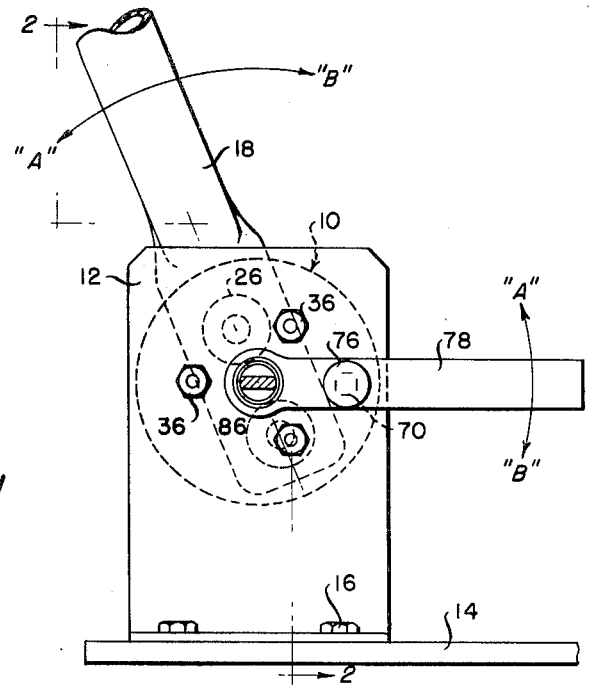
FIGURE 1 is a side view of the present novel locking means as installed in a tilt mechanism incorporated in an automobile seat.

With reference to FIGURE 1 the novel two-way lock mechanism, indicated generally at 10, may be attached when incorporated in an automobile seat, to a bracket 12 which forms a part of a seat frame including a rail 14 to which the bracket is attached by means of screws 16. The associated back rest, details of which have been omitted for clarty, include tubular side frame members 18 and 20, member 18 being pivotally secured to the two-way lock mechanism 10 to be tiltable in both directions of rotation as indicated by the arrow in FIGURE 1.

Figure 2:
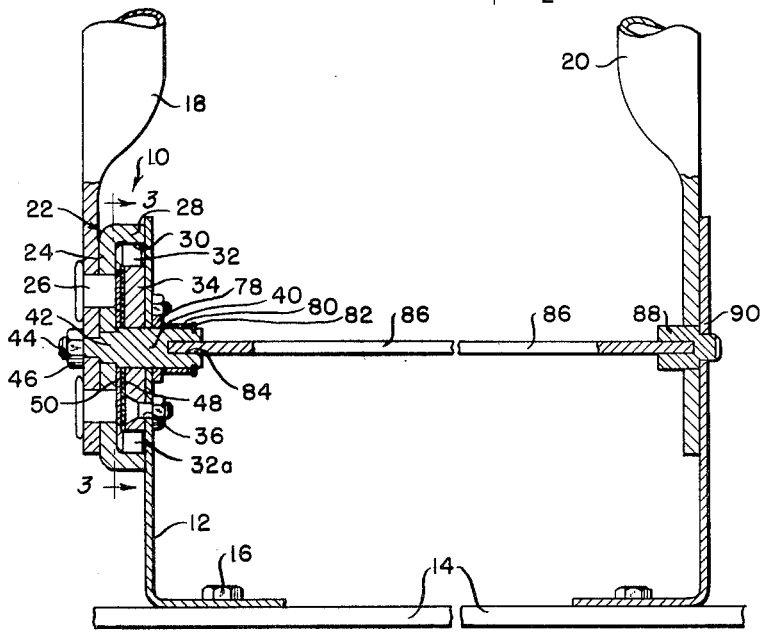
FIGURE 2 is a section taken along line 2—2 of FIGURE 1.
Figure 3:
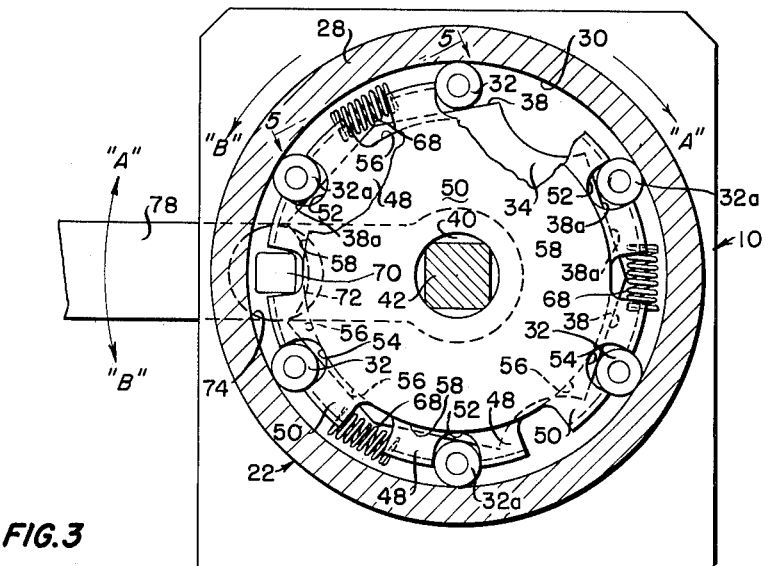
FIGURE 3 is an enlarged vertical section taken along line 3—3 of FIGURE 2.

With further reference to FIGURES 2 and 3, the novel two-way lock mechanism is enclosed in a cup-shaped casing 22 which provides a cover portion 24 onto which the pivoted frame member 18 is attached as by rivets 26 to be rotated therewith. The casing 22 is also provided with a circumferential flange 28 which spaces the cover portion 24 from the bracket 12, thus enclosing the clutch or lock mechanisms.

The inner surface of the flange 28 forms an outer race or locking surface 30 for a series of rollers 32 and 32a circumferentially equally spaced therealong. Rollers 32, 32a are retained against the outer race 30 by an inner concentric cam or clutch member 34 non-rotatably secured to the bracket 12 by means of stud and nut assemblies 36 (FIGURE 2). The periphery of the cam member 34 is provided with a number of flat sections 38 and 38a which correspond in number to the number of rollers 32, 32a. The sections 38, 38a which provide the inner races of the rollers are of identical length and extend chordally of the outer race 30 and are arranged in pairs extending in opposite directions. The distance between the outer race 30 and the sections 38, 38a, that is, at the center of the assumed chords is greater than the diameter of the rollers 32, 32a. When the rollers 32, 32a are positioned at or near the centers of the sections 38 and 38a the outer race 30 is freely rotatable around the rollers. However, the rollers 32 and 32a are normally in the position of FIGURE 3 and are wedged between the ends of cam sections 38 and 38a and the outer race 30 locking the outer race against rotation in either direction.

Figure 4:
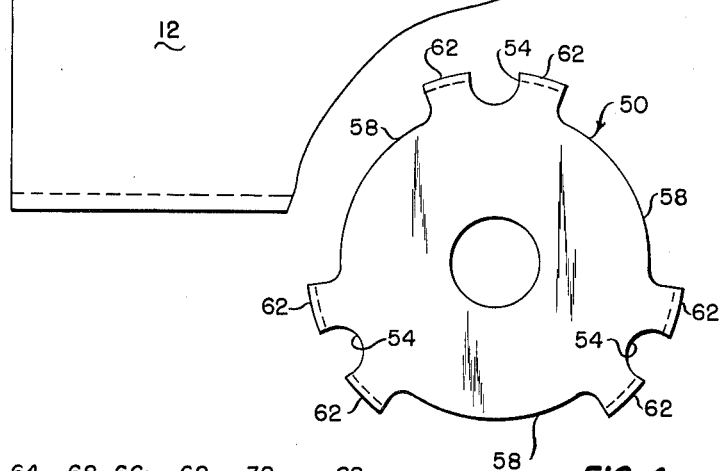
FIGURE 4 is an elevation of one component of the lock mechanism.

The groups of rollers 32 and 32a are normally held in the wedged position as illustrated in FIGURE 3 by the following mechanism. Positioned between the cam member 34 and the cover portion 24 of the casing 22 are two substantially identical carriers, plates 48 and 50 (the latter being shown separately in FIGURE 4) which are rotatable relative to each other around a center stud 40 mounted for free rotation on plate 12 and cam member 34. A portion 42 of the stud 40 is of square cross-section and extends through a corresponding opening in cover portion 24 of housing 22 to lock these parts against relative rotation. The stud 40 is axially secured to the frame member 18 by a threaded extension 44 and nut 46.

The plates 48 and 50 are provided with equally spaced small identical, semi-circular recesses 52 and 54 respectively offset circumferentially, a recess 52 of the plate 48 being followed by a recess 54 of the plate 50, then again a recess 52, and so on. The rollers 32 extend partly into the recesses 54 of the plate 50 and the rollers 32a extend partly into the recesses 52 of the plate 48 to be retained by their respective plates. Between the smaller roller retaining recesses 52 and 54 of plates 48 and 50 are equally spaced larger recesses 56 and 58, respectively, which overlap each other such that the roller retaining recesses of one plate are directly opposite and positioned centrally of the larger recesses of the other plate 50 to allow radial displacement of the rollers 32 and 32a without interference by either plate.

Figure 5:
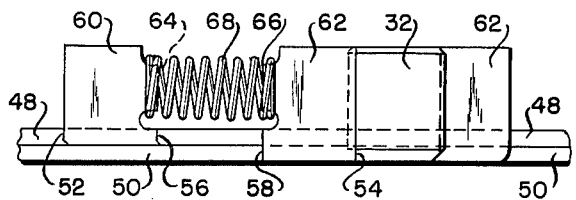
FIGURE 5 is an enlarged fragmentary section along line 5—5 of FIGURE 3 showing the roller and spring detaining means more in detail.

With further reference to FIGURE 5 the plates 48 and 50 are provided at the sections between the corresponding recesses 52, 56 and 54, 58 with inwardly bent flanges 60 and 62 which extend over the cam member 34 towards the bracket 12 thereby securely retaining the rollers 32 and 32a in the recesses 54 and 52. Corresponding opposite flanges 60 and 62 of the plates 48 and 50 between adjacent rollers 32 and 32a are provided with tangs 64 and 66 respectively to support an extension coil spring 68 overlying the vertex of adjoining cam sections 38 and 38a. One end of the coil spring 68 is supported on flange 60 of the inner plate 48 and the other end of coil spring 68 is supported on flange 62 of the outer plate 50, as shown in FIGURE 5 in such manner that the extension force of the spring tends to rotate the plates 48, 50 in opposite directions thus oppositely wedging the groups of rollers 32 and 32a between the outer race 30 and the cam sections 38 and 38a. Plates 48 and 50 are identical except for the formation of the tangs 64 and 66.

A release lever 78 extends laterally along the inside of bracket 12 and is pivotally secured around the outwardly extended end of the center stud 40 by a sleeve 80 and snap ring 82. Lever 78 is freely rotatable around stud 40 so that lever movement will not rotate stud 40 and rotation of the stud 40 by the frame member 18 will not affect the position of the lever 78. The lever carries a square shaped stud 70 which extends through recesses 56 and 58 and a recessed portion 72 of the cam member 34. The stud 70 also extends through a large aperture 74 in the bracket.

Upon rotation of the lever 78 in either direction the stud 70 will be displaced along an arc within the limits defined by the aperture 74. By this movement the stud 70 rotates either plate 48 or 50 in relation to the other depending on the direction of rotation of the lever 78 thus freeing either rollers 32 or 32a from their wedging engagement, allowing rotation of the outer race 30 in one direction of the other.

Thus, the lock mechanism 10 essentially comprises a pair of oppositely acting unidirectional clutch mechanisms and means for selectively disabling a selected one of said clutch mechanisms.

The projecting inner end of the stud 40 is axially slotted at 84 to receive one end of a flat torsion bar 86 which extends across the seat towards the other seat back frame member 20 where the torsion bar is secured in a slotted stud 88 non-rotatably attached to a bracket 90 bolted to the seat frame member 14. Back rest frame member 20 is freely rotatable around stud 88 and it will be understood that by reason of known back rest constructions the two back rest frame members 18 and 20 rotate together as a unit. The torsion bar 86 is provided to return and retain the seat back from an adjusted position to its original normal position by its twisting force set up in the torsion bar when member 18 is rotated in either direction. This arrangement, however, may be omitted if not desired and is not necessary to the functioning of the lock mechanism 10 and as such does not form part of the present invention.

The lock mechanism operates in the following manner:

The lock mechanism 10 is normally held in locked position in both directions as is shown in FIGURE 3. If it is desired to rotate member 18 in the direction "A" (counterclockwise in FIGURE 1, clockwise in FIGURE 3) to a more reclined adjusted position, the release lever 78 is rotated in the opposite direction "B" which causes the outer plate 50 to be rotated in the same direction by the stud 70 against the force of the springs 68 thereby displacing the rollers 32 associated with this plate along the cam sections 38 towards the greater distance between the cam surface and the outer race 30, thus allowing the outer race 30 to be rotated in the direction "A" by means of its attachment to frame member 18. During this manipulation the position of the other plate 48 and associated rollers 32a remains unchanged. When the desired position for member 18 is reached the hand lever 78 is released, the springs 68 rotate the plate 50 in the opposite direction thus again wedging rollers 32 between the outer race 30 and the cam sections 38 thereby firmly locking member 18 in the new position.

When movement in direction "B" is desired the hand lever 78 is rotated in the opposite direction "A" which causes the inner plate 48 to be rotated by the stud 70 against the force of the springs 68 displacing the rollers 32a along the other cam sections 38a thus allowing the outer race 30 to be rotated in the opposite direction "B" when member 18 is rotated in that direction which can be either automatically by means of the energy stored in torson bar 86 during the prior movement of member 18 or by hand. Release of the hand lever 78 cause the springs 68 to rotate the plate 48 in the opposite direction to once more lock the member 18 in the new position.

It will be appreciated that the ability of the present novel locking mechanism to lock the rotating member in both directions of rotation constitutes a marked advantage in automobile seat back adjusting mechanisms adding stability to the back rest and preventing any mishap which may occur with a loose back rest.

Due to the unique design of the release mechanism the complete lock assembly can be held to the same dimensions as a simple one-way lock mechanism and is easily adaptable to the various existing automobile seat frame designs.

The invention may be embodied it other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Mechanism for adjusting the position of a seat back assembly pivotally carried by a relatively stationary seat frame assembly comprising a first locking member rigid with one of said assemblies, a second locking member rigid with the other of said assemblies, means forming sets of opposed locking surfaces on said locking members, a first wedge member interposed between one set of locking surfaces and a second wedge member interposed between another set of locking surfaces, means normally urging each of said wedge members into locking engagement with the adjacent locking surfaces to lock said locking members against relative rotation, and means for selectively moving either one or the other of said wedge members out of locking engagement to permit rotation of said seat back assembly in a selected direction with respect to said seat frame assembly.

2. Mechanism for adjusting the position of a seat back assembly pivotally carried by a relatively stationary seat frame assembly comprising a first member rotatable with said seat back assembly and having an internal cylindrical locking surface, a cam member rigid with said seat frame assembly and mounted within said first member, means forming a series of essentially flat locking surfaces on said cam member, a wedge member interposed between each of said flat surfaces and said cylindrical surface on said first member, separate movable carriers for alternate ones of said wedge members, means normally urging said carriers in a direction to move said wedge members into locking engagement with the adjacent locking surfaces, and means for selectively moving either one of said carriers independently of the other to move the wedging member carried thereby out of wedging engagement with the adjacent locking surfaces to permit rotation of said first member and said seat back assembly in a selected direction with respect to said seat frame assembly.

3. The combination according to claim 2 wherein said last-mentioned means comprises a release member having an operating handle positioned externally of said first member and mounted for movement in opposite directions away from a neutral position, and means carried by said operating member engageable with a selected one of said carriers when said release member is moved away from said neutral position.

4. Mechanism for adjusting the inclination of an automobile seat back assembly with respect to a relatively stationary seat fram assembly on which said seat back assembly is pivoted, first and second oppositely acting unidirectional clutch means between said assemblies at their pivotal connection, spring means biasing each of said clutch means into locking condition, and control means movable in opposite directions away from a neutral position to disable only a selected one of said clutch means to permit rotation of said seat back assembly in a selected direction to a selected inclination, said control means, when released, permitting said spring means to automatically lock said seat back against rotation in either direction away from the selected inclined position.

5. Means for adjusting the position of an automobile seat back assembly with respect to a relatively stationary seat frame assembly on which said seat back assembly is pivoted comprising an inner clutch part rigid with said seat frame assembly and having a plurality of inclined cam surfaces distributed along its periphery, an outer clutch part rigid with said seat back assembly and having a cylindrical inner periphery enclosing said inner clutch part, a roller interposed between each of said cam surfaces and the cylindrical inner periphery of said outer clutch part, a first rockable carrier interposed between said clutch parts and having pockets in which alternate ones of said rollers are disposed, a second rockable carrier interposed between said clutch parts and having pockets in which the others of said rollers are disposed, spring means biasing said carriers apart to displace said rollers in a direction to wedgingly lock said clutch parts against rotation in either direction, and release means for selectively moving either one or said carriers independently of the other to move the rollers carried thereby away from locking position to permit rotation of said seat back assembly in a selected direction with respect to said seat frame assembly.

6. Means for adjusting the position of a seat back assembly pivotally carried by a seat frame assembly, comprising first and second unidirectional clutch assemblies interposed between said seat assemblies at their pivotal connection, said first clutch assembly being operable to prevent relative rotation of said seat back assembly in one direction with respect to said seat frame assembly, said second clutch assembly being operable to prevent rotation of said seat back assembly in the opposite direction, and single release means for selectively disabling one of said clutch assemblies to permit rotation of said seat back assembly in a selected direction with respect to said seat frame assembly.

7. Mechanism for adjusting the position of an automobile seat back assembly on which said seat back assembly is pivoted comprising an inner clutch member rigid with said seat frame assembly, said inner clutch member having first and second series of essentially flat locking surfaces, an outer clutch member having a rigid with said seat frame assembly, said inner clutch member and said locking surfaces, a first series of rollers engageable with said first series of locking surfaces and said cylindrical locking surface, a second series of rollers engageable with said second series of locking surfaces and said cylindrical locking surface, a first rockable carrier having recesses for the reception of said first series of rollers, a second rockable carrier having recesses for the reception of said second series of rollers, spring means operatively engaging said carriers to rock said carriers in opposite directions to wedge each series of rollers into locking engagement with its associated locking surfaces to thereby lock said seat back assembly against rotation in either direction with respect to said seat frame assembly, and release means movable in opposite directions away from a neutral position to rock a selected one of said carriers in a direction to move its associated series of rollers out of locking engagement with its associated locking surfaces to thereby permit movement of said seat back assembly in a selected direction with respect to said seat frame assembly.

References Cited by the Examiner

UNITED STATES PATENTS

| 2,595,394 | 5/1952 | Lauterbach | 297—374 |
| 3,135,550 | 6/1964 | Bosack | 297—374 |

FRANK B. SHERRY, *Primary Examiner.*